US005812688A

United States Patent [19]

Gibson

[11] Patent Number: 5,812,688

[45] Date of Patent: Sep. 22, 1998

[54] METHOD AND APPARATUS FOR USING VISUAL IMAGES TO MIX SOUND

[76] Inventor: David A. Gibson, 2175 Alameda de las Pulgas, Redwood City, Calif. 94061

[21] Appl. No.: 423,685

[22] Filed: Apr. 18, 1995

Related U.S. Application Data

[63] Continuation-in-part of Ser. No. 118,405, Sep. 7, 1993, abandoned, which is a continuation-in-part of Ser. No. 874,599, Apr. 27, 1992, abandoned.

[51] Int. Cl.[6] .......... H04B 1/00

[52] U.S. Cl. .......... 381/119; 381/61

[58] Field of Search .......... 381/119, 109, 381/102, 63, 61, 17, 18, 1; 84/625, 626, 622, 659, 660, 630, DIG. 28; 395/140; 345/139

[56] References Cited

U.S. PATENT DOCUMENTS

| | | | |
|---|---|---|---|
| 4,792,974 | 12/1988 | Chace . | |
| 4,993,073 | 2/1991 | Sparkes | 381/119 |
| 5,027,689 | 7/1991 | Fujimori . | |
| 5,048,390 | 9/1991 | Adachi et al. . | |
| 5,153,829 | 10/1992 | Furuya et al. . | |
| 5,212,733 | 5/1993 | De Vitt et al. . | |
| 5,283,867 | 2/1994 | Bayley et al. . | |
| 5,286,908 | 2/1994 | Jungleib . | |

OTHER PUBLICATIONS

D.A. Gibson, California Recording Institute Demonstration Video Tape, including news broadcast from KRON Newscenter 4 dated Nov. 1991.

D.A. Gibson, California Recording Institute brochure dated Oct. 1991.

*Primary Examiner*—Curtis Kuntz
*Assistant Examiner*—Ping W. Lee
*Attorney, Agent, or Firm*—Limbach & Limbach, LLP

[57] ABSTRACT

A method and apparatus for mixing audio signals. Each audio signal is digitized and then transformed into a predefined visual image, which is displayed in a three-dimensional space. Selected audio characteristics of the audio signal, such as frequency, amplitude, time and spatial placement, are correlated to selected visual characteristics of the visual image, such as size, location, texture, density and color. Dynamic changes or adjustment to any one of these parameters causes a corresponding change in the correlated parameter.

2 Claims, 11 Drawing Sheets
(8 of 11 Drawing(s) Filed in Color)

LIMITS OF STEREO IMAGING

"V" Mix

"Inverted V" Mix

"Wavy Line" Mix

Simple Structure

Even Volume Relationships

Scattered Placement Mix

Fattening

Reverb

Symmetrical Mix

Threshold of a
Compressor/Limiter

Threshold of a
Noise Gate

Delay time with
Regeneration

Long Delay
panned separately

METHOD AND APPARATUS FOR USING VISUAL IMAGES TO MIX SOUND

This application is a continuation in part of Ser. No. 08/118,405, filed on Sep. 7, 1993, now abandoned which in turn was a continuation in part of Ser. No. 07/874,599, filed on Apr. 27, 1992, now abandoned.

BACKGROUND

The present invention relates generally to the art of mixing audio source signals to create a final sound product, and more specifically, to a method and apparatus for utilizing visual images of sounds to control and mix the source signals, including any sound effects added thereto, to achieve a desired sound product.

The art of mixing audio source signals is well known and generally referred to as recording engineering. In the recording engineering process, a plurality of source audio signals are input to a multi-channel mixing board (one source signal per channel). The source signals may be analog or digital in nature, such as microphone signals capturing a live performance, or a prerecorded media such as a magnetic tape deck, or a MIDI device (musical instrument digital interface) such as a synthesizer or drum machine. The mixing board permits individual control of gain, effects, pan, and equalization for each channel such that the recording engineer can modify individual channels to achieve the desired total sound effect. For example, it is possible for an individual person to record the performance of a song by recording the playing of different instruments at different times on different channels, then mixing the channels together to produce a stereophonic master recording representative of a group performance of the song. As should be obvious, the sound quality, including volume output, timbral quality, etc., of each channel can vary greatly. Thus, the purpose of the mix is to combine the different instruments, as recorded on different channels, to achieve a total sound effect as determined by the recording engineer.

The recording industry has evolved into the digital world wherein mixing boards and recorders manipulate and store sound digitally. A typical automated mixing board creates digital information that indicates mixing board settings for each channel. Thus, these mixer board settings can be stored digitally for later use to automatically set the mixer board. With the advent of MIDI control, computer controlled mixing boards have begun to appear. Such systems include software which shows a picture of a mixing board on the computer screen, and the recording engineer uses a mouse to manipulate the images of conventional mixing board controls on the screen. The computer then tells the mixer to make the corresponding changes in the actual mixing board.

There are also digital multitrack recorders that record digital signals on tape or hard disk. Such systems are also controlled by using a mouse to manipulate simulated recorder controls on a computer screen.

A new generation of controllers are being developed to replace the mouse for interacting with computers. For example, with a data glove or a virtual reality system one can enter the computer screen environment and make changes with their hands. Further, visual displays are becoming increasingly sophisticated such that one gets the illusion of three-dimensional images on the display. In certain devices, the visual illusion is so good that it could be confused with reality.

Computer processors have just recently achieved sufficient processing speeds to enable a large number of audio signals from a multitrack tape player to be converted into visual information in real time. For example, the Video Phone by Sony includes a Digital Signal Processor (DSP) chip that makes the translation from audio to video fast enough for real time display on a computer monitor.

The concept of using visual images to represent music is not new. Walt Disney Studios might have been the first to do so with its innovative motion picture "Fantasia." Likewise, Music Television (MTV) has ushered in an era of music videos that often include abstract visual imaging which is synchronized with the music. However, no one has yet come up with a system for representing the intuitive spatial characteristics of all types of sound with visuals and using those spatial characteristics as a control device for the mix. The multi-level complexities of sound recording are such that very little has even been written about how we visualize sound between a pair of speakers. In fact, there is no book that even discusses in detail the sound dynamics that occur between speakers in the mix as a visual concept.

SUMMARY OF THE INVENTION

The present invention provides a method and apparatus for mixing audio signals. According to the invention, each audio signal is digitized and then transformed into a predefined visual image. Selected audio characteristics of the audio signal, such as frequency, amplitude, time and spatial placement, are correlated to selected visual characteristics of the visual image, such as size, location, texture, density and color, and dynamic changes or adjustment to any one of these parameters causes a corresponding change in the correlated parameter.

A better understanding of the features and advantages of the present invention will be obtained by reference to the following detailed description of the invention and the accompanying drawings which set forth an illustrative embodiment in which the principles of the invention are utilized.

The file of this patent contains at least one drawing executed in color. Copies of this patent with color drawing (s) will be provided by the Patent and Trademark Office upon request and payment of the necessary fee.

BRIEF DESCRIPTION OF THE DRAWINGS

FIG. 11*c* and 11*d* illustrate short and long delays, respectively.

DETAILED DESCRIPTION OF THE INVENTION

The present invention provides a system for mixing audio signals whereby the audio signals are transformed into visual images and the visual images are displayed as part of a three-dimensional volume of space on a video display monitor. The characteristics of the visual images, such as shape, size, spatial location, color, density and texture are correlated to selected audio characteristics, namely frequency, amplitude and time, such that manipulation of a visual characteristic causes a correlated response in the audio characteristic and manipulation of a audio characteristic causes a correlated response in the visual characteristic. Such a system is particularly well suited to showing and adjusting the masking of sounds in a mix.

Figure 1:
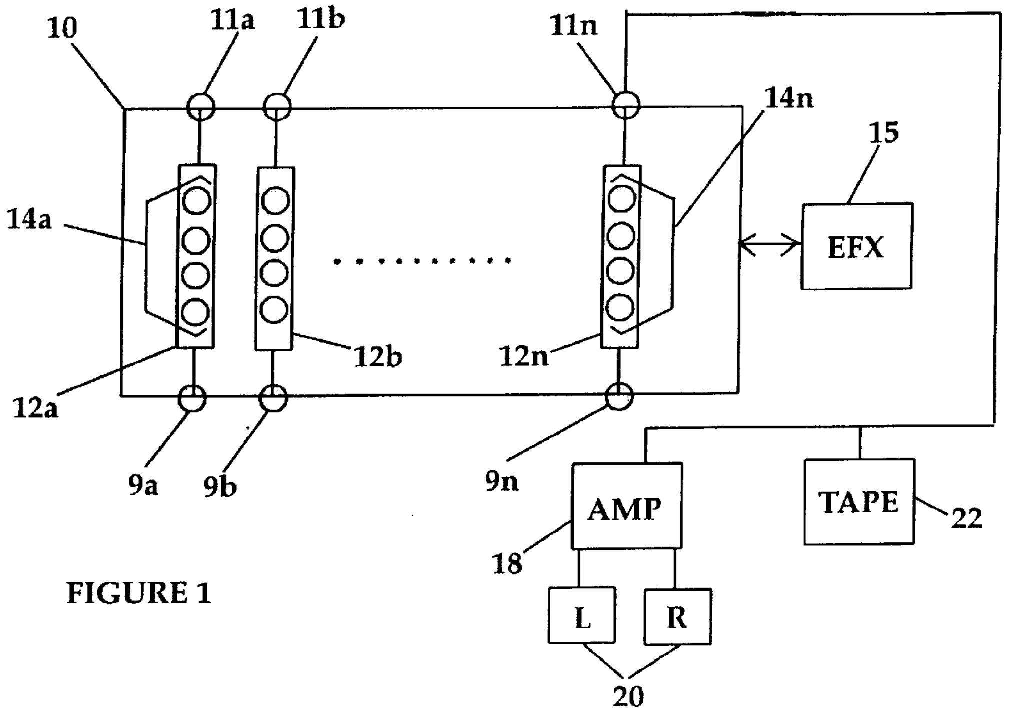
FIG. 1 is a block diagram of a conventional audio mixing system.

Referring now to FIG. 1, a block diagram of a conventional audio mixing system is illustrated. The heart of the system is a mixing console 10 having a plurality of channels 12*a* through 12*n*, each having an input 9, an output 11, and user controls 14*a* through 14*n*. The user controls 14 allow individual control of various signal characteristics for a channel, such as gain, effects, pan and equalization. The mixing console 10 may be any existing analog, digital or MIDI mixing console. For example, preferred analog mixing consoles are made by Harrison and Euphonics, preferred digital consoles are made by Yamaha and Neve, and preferred MIDI mixing consoles include J. L. Cooper's CS1, Mark of the Unicorn's MIDI mixer, and Yamaha's Pro Mix 1 mixer.

Sound signals may be provided to the mixing console 10 by various analog or digital audio sources (not shown), such as microphones, electric instruments, MIDI instruments, or other audio equipment, such as a multitrack tape deck, and each sound signal is therefore connected to a single channel 12. Preferred MIDI sequencers include Performer V 4.1 made by Mark of the Unicorn and Vision made by Opcode Systems. Preferred analog multitrack tape decks include those made by Studer A80, A827, Ampex M1100/1200, MCI JH24, Otari, or Sony. Preferred digital multitrack tape decks include those made by Sony, Mitsubishi, Alexis' ADAT and Tascam's DA88. Preferred digital to hard disk multitrack decks include Dyaxis by Studer, Pro-Tools by Digidesign, and Sonic Solutions.

Signals from the mixing console 10 may also be sent to an effects and processing unit (EFX) 15 using the send control and the returned signal is received into another channel of the console. Preferred effects and processing units include the Alesis "Quadraverb", Yamaha's "SPX90II", Lexicon's 480L, 224, LXP1, LXP5, and LXP15.

The output signals 11 from the mixing console 10 are available from each channel 12. The final mix will generally comprise a two channel stereophonic mix which can be recorded on storage media, such as multitrack tape deck 22, or driven through amplifier 18 and reproduced on speakers 20.

Figure 2:
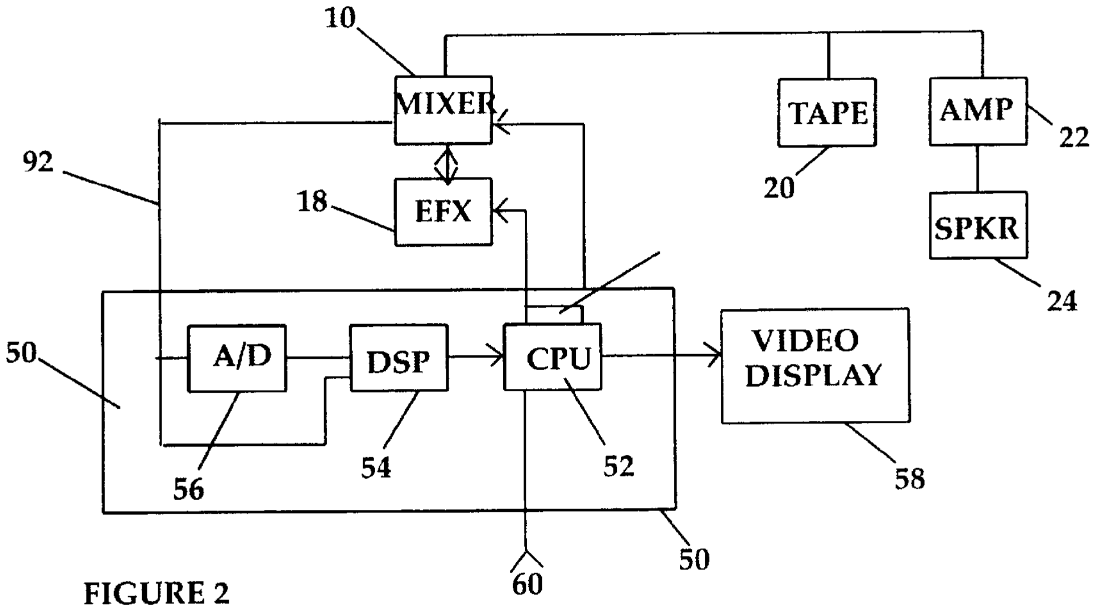
FIG. 2 is a block diagram of an audio mixing system constructed in accordance with the present invention.

Referring now to FIG. 2, and in accordance with the present invention, a microcomputer system 50 is added to the mixing system. The microcomputer system 50 includes a central processing unit (CPU) 52, a digital signal processing unit (DSP) 54, and an analog-to-digital converter (A/D) 56.

Sound signals are intercepted at the inputs 9 to the mixing console 10, then digitized, if necessary, by A/D unit 56. A/D unit 56 may be any conventional analog-to-digital converter, such as that made by DigiDesigns for its Pro Tools mixer, or by Sonic Solutions for its mixer. The output of the A/D unit 56 is then fed to the DSP unit 54.

The DSP unit 54 transforms each digitized sound signal into a visual image, which is then processed by CPU 52 and displayed on video display monitor 58. The displayed visual images may be adjusted by the user via user control 60.

The preferred DSP unit 54 is the DSP 3210 chip made by AT&T. The preferred CPU 52 is an Apple Macintosh IIfx having at least 8 Mb of memory and running the Apple Operating System 6.8. A standard automation or MIDI interface 55 is used to adapt the ports of the microcomputer system 50 to send and receive mix information from the mixing console 10. MIDI Manager 2.0.1 by Apple Computer is preferably used to provide custom patching options by menu.

The CPU 52 and DSP unit 54 must be provided with suitable software programming to realize the present invention. The details of such programming will be straightforward to one with ordinary skill in such matters given the parameters as set forth below, and an extensive discussion of the programming is therefore not necessary to explain the invention.

Figure 3:
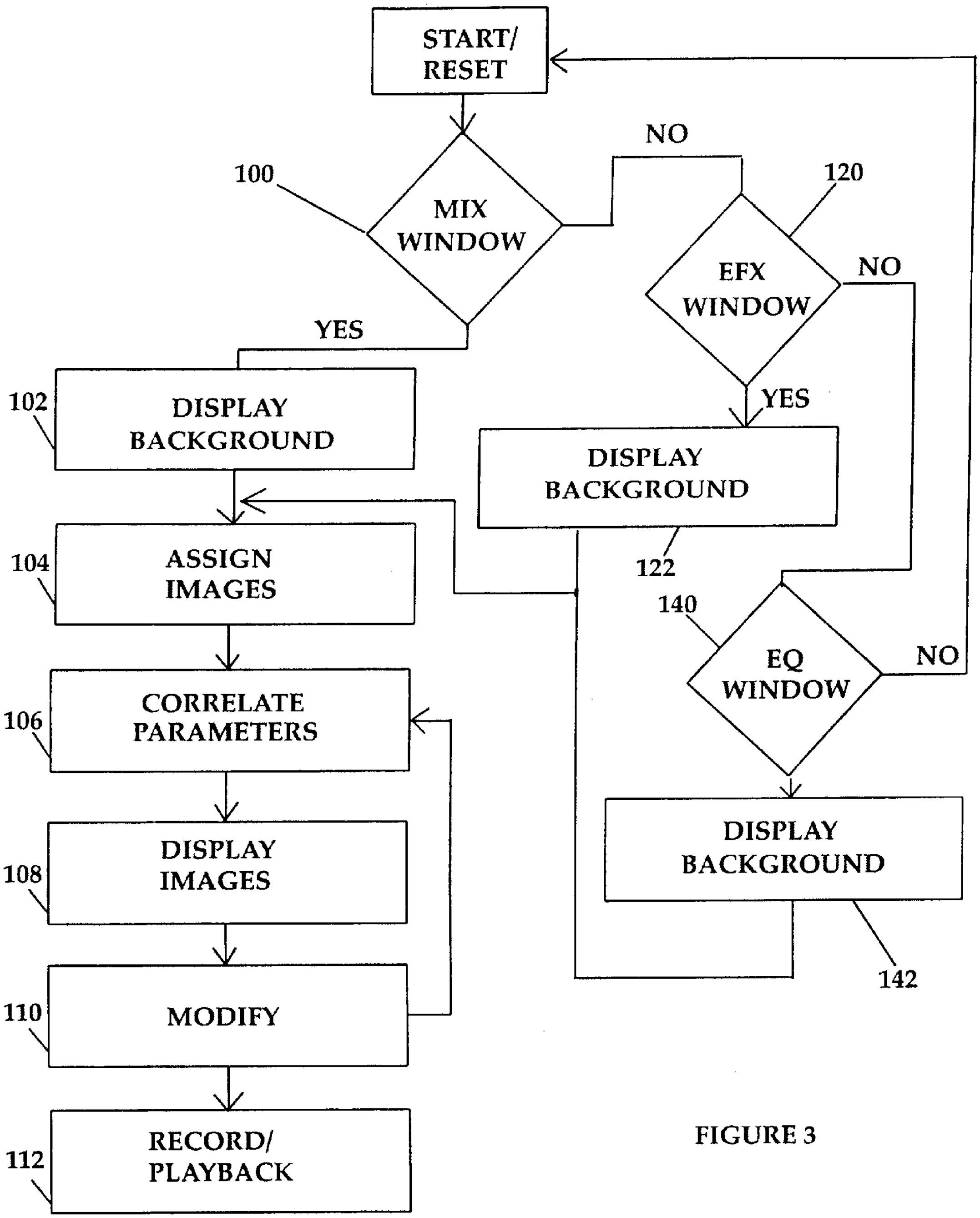
FIG. 3 is a flow chart illustrating the basic program implemented in the audio mixing system of FIG. 2.

Referring now to FIG. 3, the user is provided with a choice of three "windows" or visual scenes in which visual mixing activities may take place. The first window will be called the "mix window" and may be chosen in step 100. The second window will be called the "effects window" and may be chosen in step 120. The third window will be called the "EQ window" and may be chosen in step 140. The choices may be presented via a pull-down menu when programmed on an Apple system, as described herein, although many other variations are of course possible.

In the mix window, a background scene is displayed on the video display monitor 58 in step 102. Each channel 12 is then assigned a predefined visual image, such as a sphere, in step 104. Each visual image has a number of visual characteristics associated with it, such as size, location, texture, density and color, and these characteristics are correlated to audio signal characteristics of channel 12 in step 106. Each channel which is either active or selected by the user is then displayed on the video display monitor 58 by showing the visual image corresponding to the channel in step 108. The visual images may then be manipulated and/or modified by the user in step 110, i.e., the visual characteristics of the visual images are altered, thereby causing corresponding changes to the audio signal in accord with the correlation scheme in step 106. Finally, the mix may be played back or recorded on media for later play back or further mixing.

Figure 4:
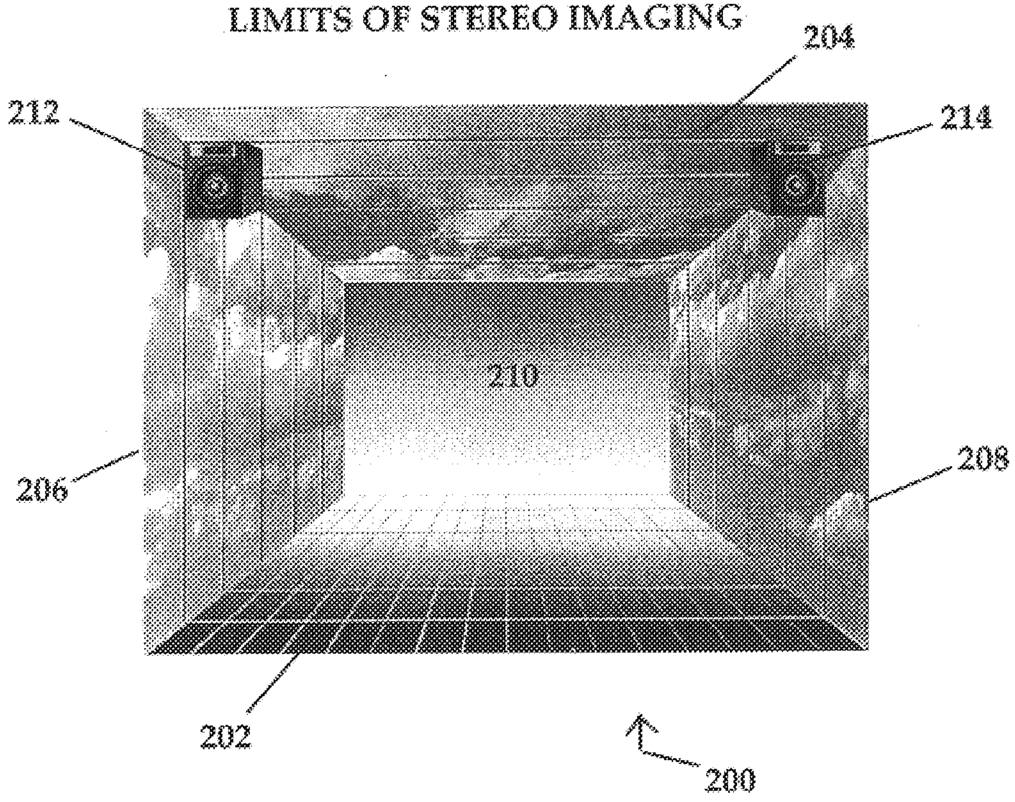
FIGS. 4 and 5 are perspective views of the mix window.
Figure 5:
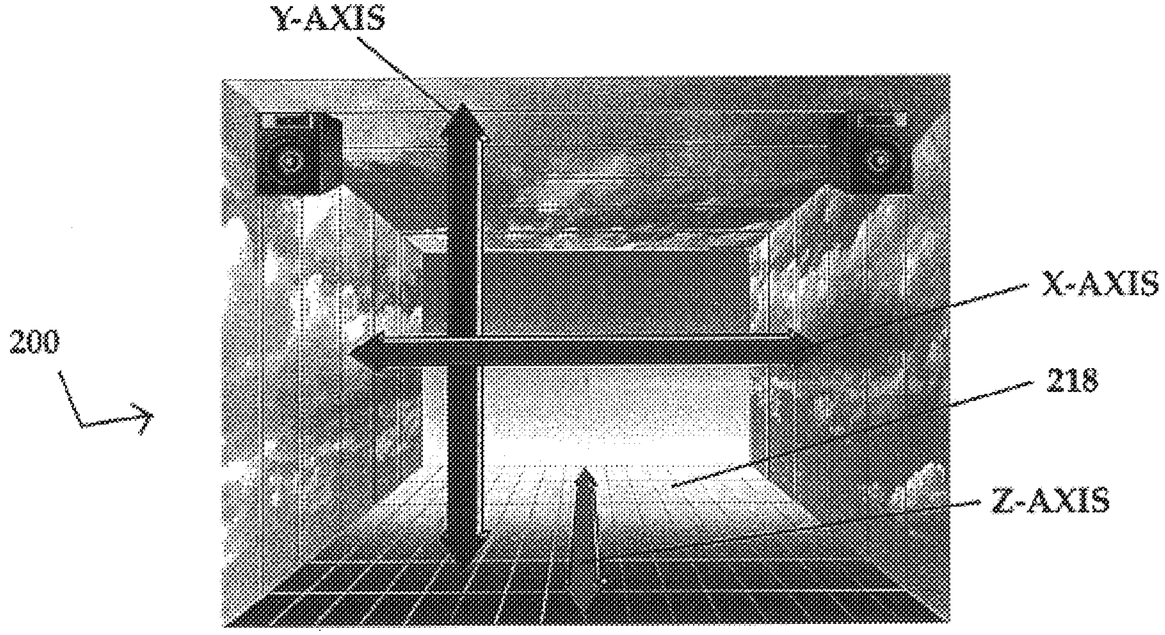

The preferred background scene for the mix window is illustrated in FIG. 4 and shows a perspective view of a three dimensional room 200 having a floor 202, a ceiling 204, a left wall 206, a right wall 208, and a back wall 210. The front is left open visually but nevertheless presents a boundary, as will be discussed shortly. Left speaker 212 and right speaker 214 are located near the top and front of the left and right walls, respectively, much like a conventional mixing studio. This view closely simulates the aural environment of the recording engineer in which sounds are perceived as coming from someplace between the speakers. A set of axes 218 is shown in FIG. 5 for convenient reference, wherein the x-axis runs left to right, the y-axis runs top to bottom, and the z-axis runs front to back, and manipulation of the visual images may be made with reference to a standard coordinate system, such as provided by axes 218.

In additional to simulating the aural environment of the recording engineer, the background scene provides boundaries or limits on the field of travel for the visual images of sounds. Generally, we perceive that sounds emanate from some place between the speakers. Thus, a visual image of a sound should never appear further left than the left speaker or further right than the right speaker. Therefore, the program uses either the left and right speakers, or the left and right walls, as limits to the travel of visual images. Sounds also usually seem to be located a short distance in front of the speakers. No matter how loud you make a sound in the mix, the sound image will not appear to come from behind the listener without adding another set of speakers or a three-dimensional sound processor. Likewise, the softest and most distant sounds in a mix normally seem to be only a little bit behind the speakers. Thus, the visual images as displayed by the present invention will ordinarily be limited by the front wall and the back wall. Further, no matter how high the frequency of a sound, it will never seem to be any higher than the speakers themselves. However, bass frequencies can often seem very low since they can travel through the floor to the listener's feet (but never below the floor). Therefore, the visual imaging framework is also limited by the top of the speakers and the floor.

In the preferred embodiment of the present invention, the shape of a dry audio signal is predefined to be a sphere. This shape is chosen because it simply and effectively conveys visual information about the interrelationship of different sounds in the mix. The other visual characteristics of the sphere, such as size, location, texture and density are made interdependent with selected audio characteristics of the source signal: size of the sphere is correlated to frequency and amplitude; x-location of the sphere is correlated to signal balance or pan control; y-location of the sphere is correlated to frequency; z-location of the sphere is correlated to volume or amplitude; texture of the sphere is correlated to certain effects and/or waveform information; and density of the sphere is correlated to amplitude. Of course, each audio signal parameter is dynamic and changes over time, and the visual images will change in accord with the correlation scheme employed. Likewise, user adjustments to the visual images must cause a corresponding change in the audio information. Typically, the DSP chip 54 will sample the audio parameters periodically, generating a value for each parameter within its predefined range, then the CPU 52 manages the updating of either visual or audio parameters in accord with the programmed correlation scheme. Such two-way translation of visual and MIDI information is described in U.S. Pat. No. 5,286,908, which is expressly incorporated herein by reference.

Figure 6:
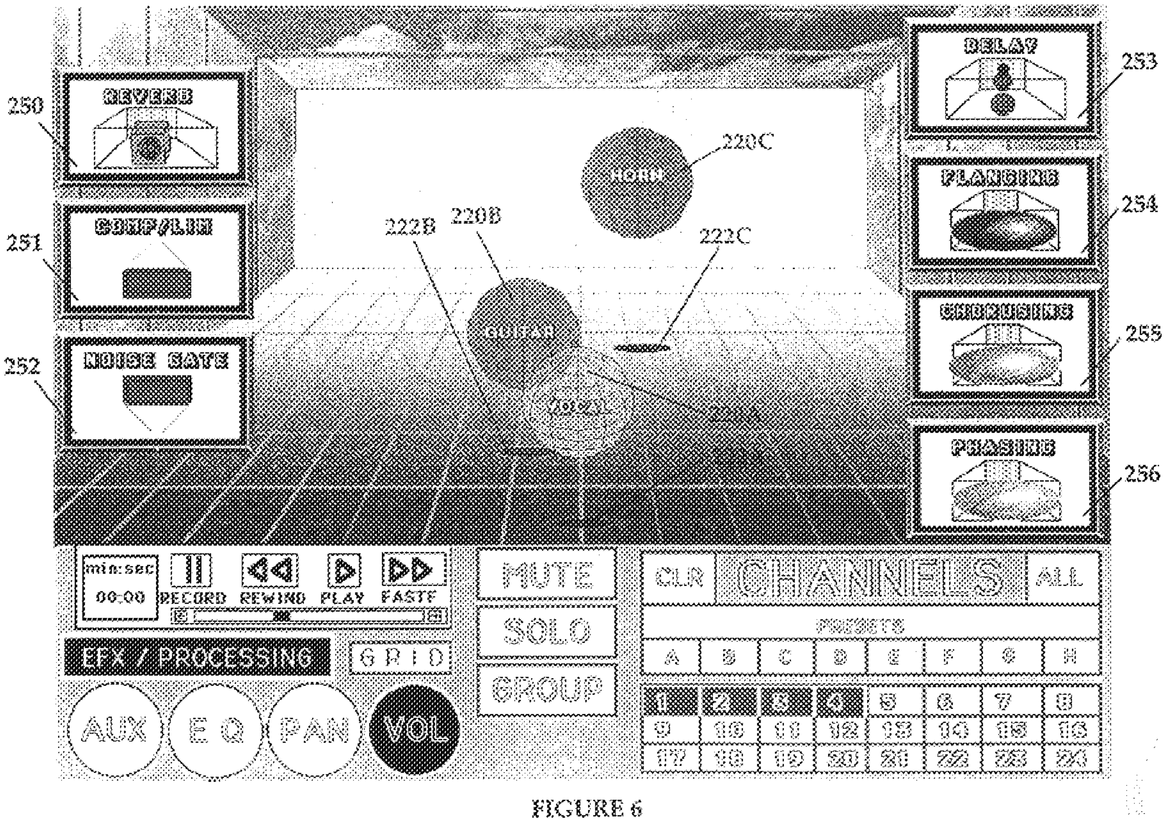
FIG. 6 is a detailed view of the mix window in the preferred embodiment including effects.

Referring now to FIG. 6, the mix window shows three spheres 220*a*, 220*b* and 220*c* suspended within the boundaries of room 200. Advantageously, shadows 222*a*, 222*b* and 222*c* are provided below respective spheres to help the user locate the relative spatial position of the spheres within the room.

In a preferred embodiment, the user control 60 (see FIG. 2) includes a touch sensitive display screen, such as Microtouch screen, which permits to user to reach out and touch the visual images and manipulate them, as will now be described.

Any of the spheres 220*a*, 220*b*, or 220*c*, may be panned to any horizontal or x-position between the speakers by moving the image of the spheres on display 58. The spheres may also be moved up and down, or in and out. In the present embodiment, wherein the three-dimensional room is represented as a two-dimensional image, it is not practical to provide in/out movement along the z-axis, therefore, both of these adjustments have the same effect, namely, to increase or decrease amplitude or volume of the selected signal. However, it is conceivable that a holographic controller could be devised wherein adjustment in both the y-direction and z-direction could realistically be provided. In that case, one of the adjustments could control amplitude and one of the adjustments could control frequency.

Since it is possible for two sounds to be in the same spatial location in a mix and still be heard distinctly, the spheres should be transparent or translucent to some degree so that two sounds can be visually distinguished even though they exist in the same general location.

The spheres may also be given different colors to help differentiate between different types of sounds. For example, different colors may be assigned to different instruments, or different waveform patterns, or different frequency ranges.

The radial size of the sphere is correlated to the apparent space between the speakers taken up by a sound in the mix. Bass instruments inherently take up more space in the mix than treble instruments, and therefore the size of the sphere is also correlated to frequency. For example, when more than two bass guitars are placed in a mix, the resulting sound is quite "muddy," and this can be represented visually by having two large spheres overlapping. However, place ten bells in a mix at once and each and every bell will be totally distinguishable from the others, and this can be represented visually by having ten small spheres located in distinct positions within room 200. Therefore, images which correspond to bass instruments should be larger than images which correspond to treble instruments. Further, the images of treble instruments will be placed higher between the speakers, and they will also be smaller than images of bass instruments, which will in turn be represented by larger shapes and placed lower between the speakers.

Figure 7A:
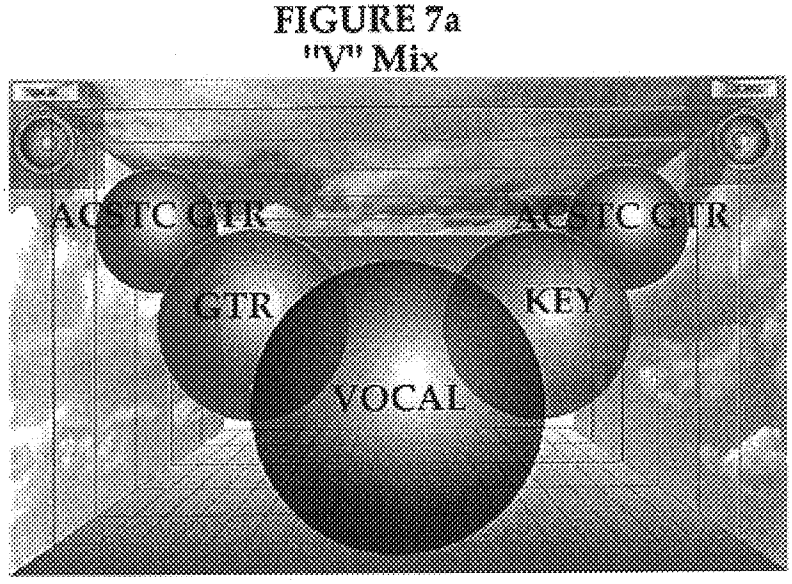
FIGS. 7*a* through 7*d* are perspective views of mix windows illustrating the placement of spheres within the window to obtain different mix variations.
Figure 7B:
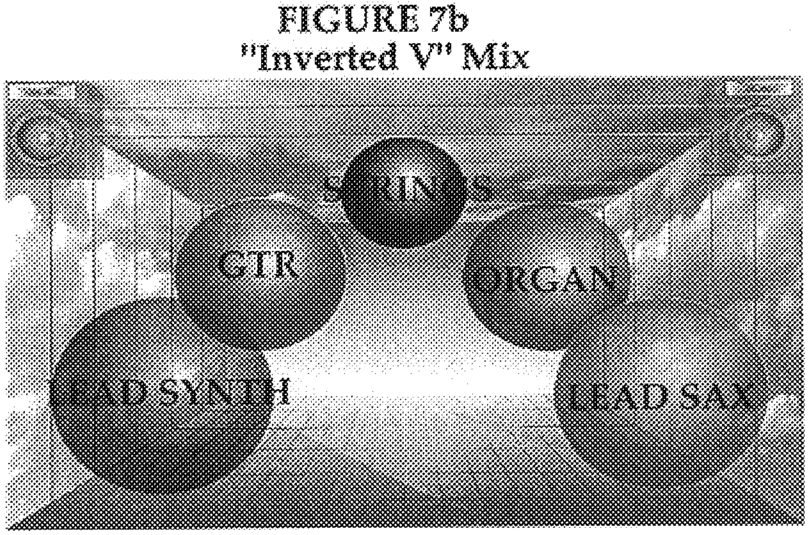
Figure 7C:
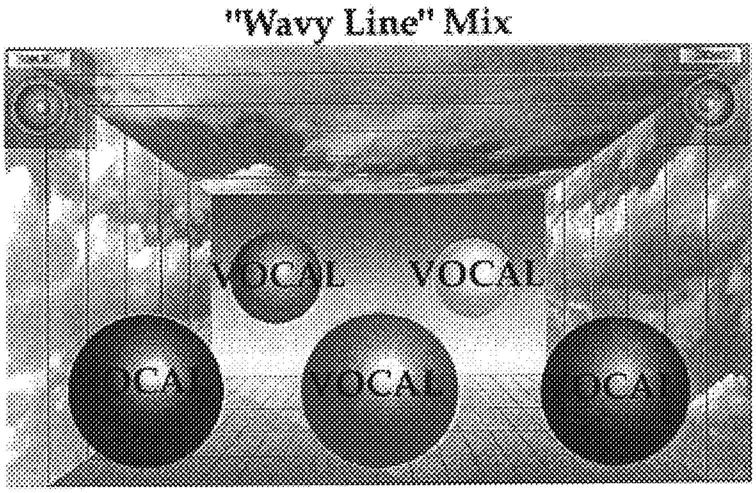
Figure 7D:
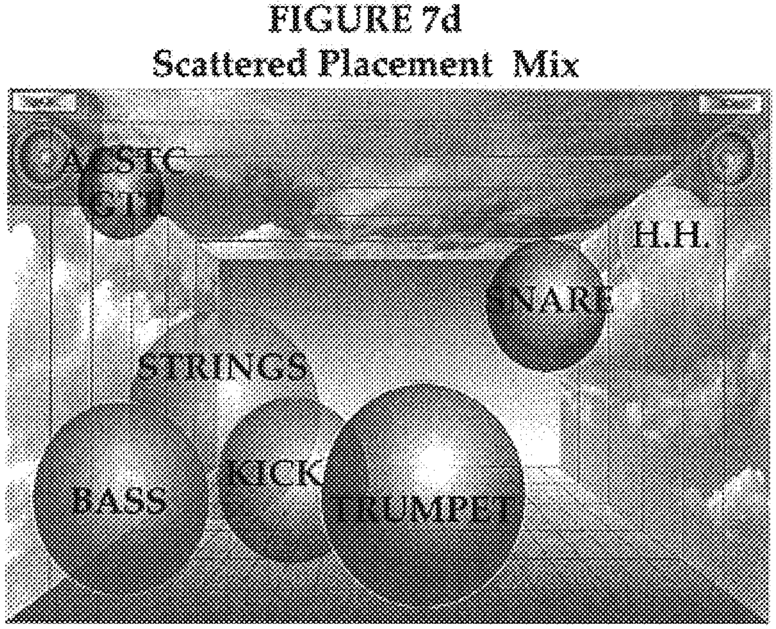

Examples of the types of visual mixes which may be obtained are shown in FIGS. 7*a* through 7*d* and FIGS. 8*a* through 8*c*. For example, in FIG. 7*a*, spheres corresponding to selected channels are arranged in a "V" formation. In FIG. 7*b*, spheres corresponding to selected channels are arranged in an inverted "V" formation. In FIG. 7*c*, spheres corresponding to selected channels are arranged to form a wavy line. In FIG. 7*d*, spheres corresponding to selected channels are scattered throughout the virtual room.

Figure 8A:
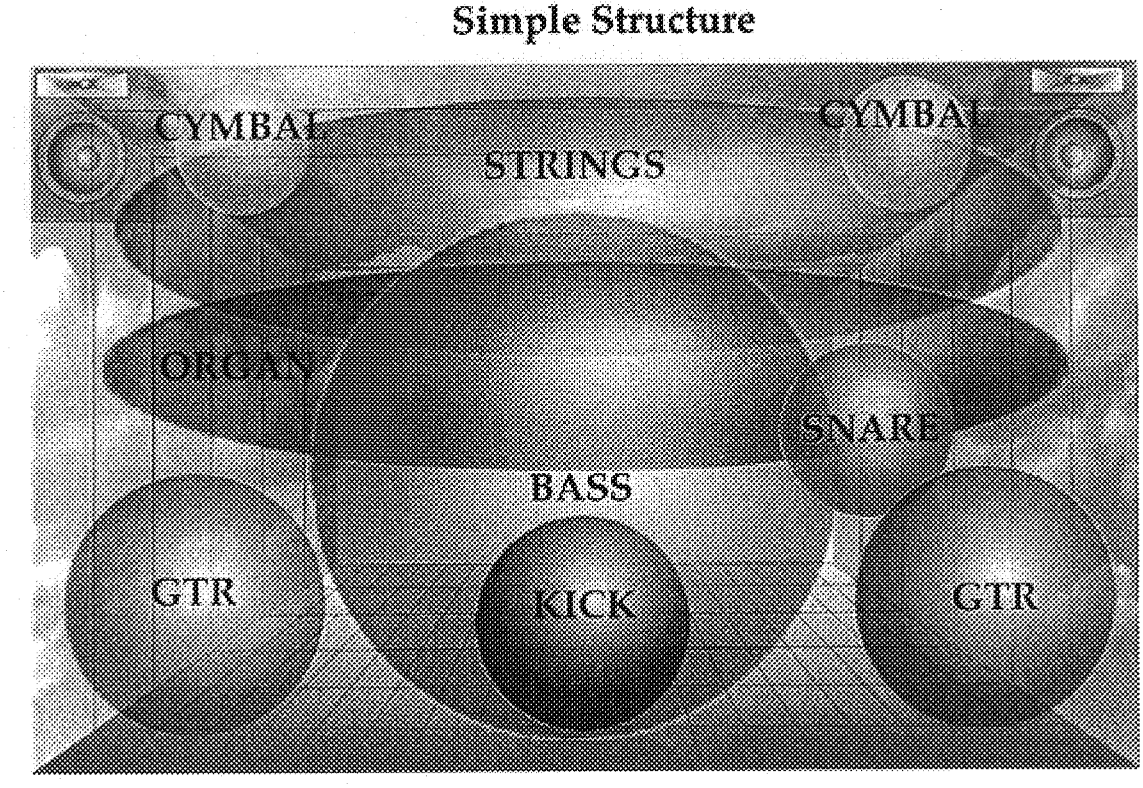
FIGS. 8*a* through 8*c* are perspective views of mix windows illustrating the placement of spheres within the window to obtain different mix variations.
Figure 8B:
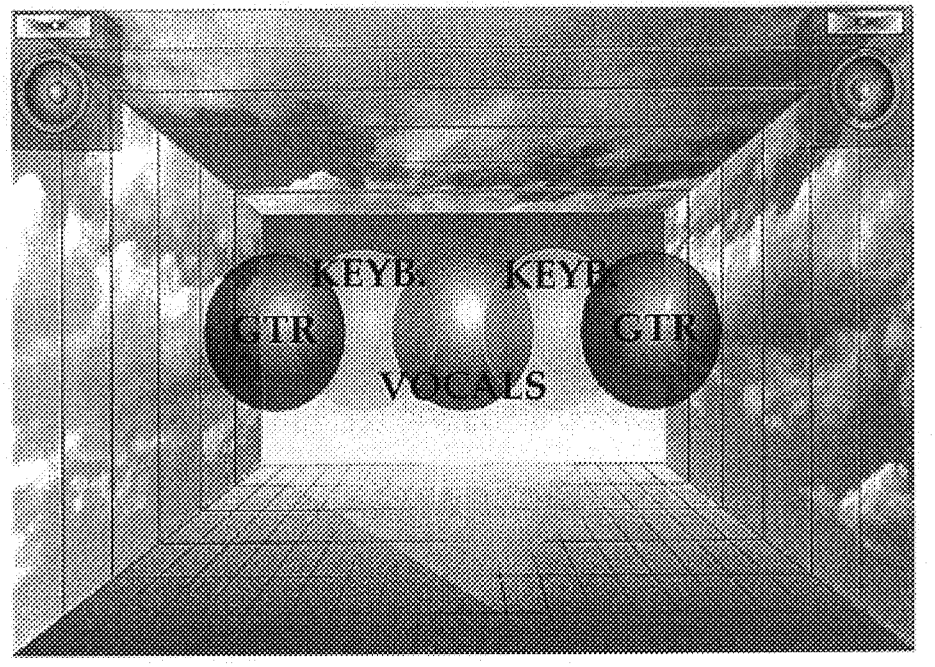
Figure 8C:
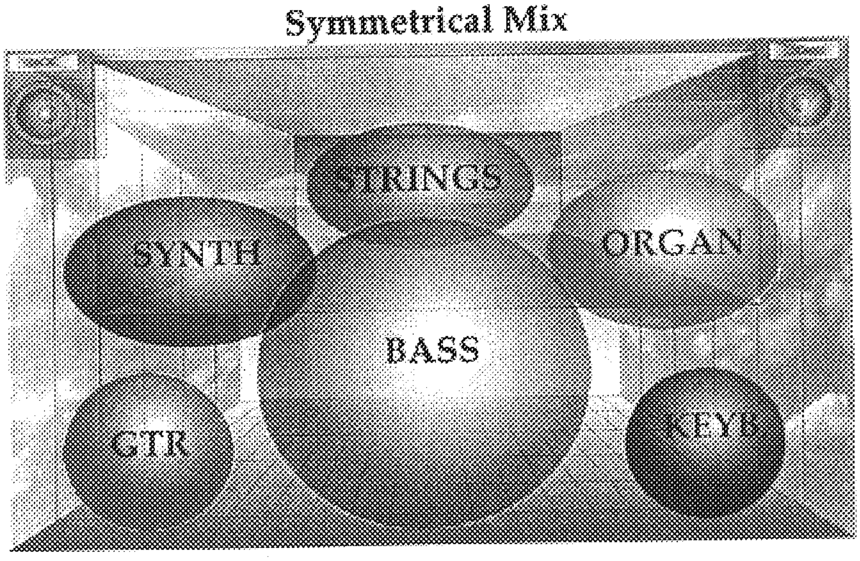

In FIG. 8*a*, spheres corresponding to selected channels are arranged in a simple structure to provide a clear and well organized mix. In FIG. 8*b*, spheres corresponding to selected channels are arranged to provide an even volume relationship between the selected channels. In FIG. 8*c*, spheres corresponding to selected channels are symmetrically arranged around the selected bass instrument channel. Many other mix variations could be represented by manipulating spheres accordingly.

Other audio parameters are also usually present in a mix, such as those provided by effects and processor units 15. Referring back to FIG. 3, these parameters may be manipulated by selecting the effects window in step 120.

The effects window is illustrated in FIG. 6, in which seven icons 250, 251, 252, 253, 254, 255 and 256 are added to the mix window to allow user selection of the following standard effects processors: reverb, compressor/limiter, noise gate, delay, flanging, chorusing or phasing, respectively. For example, delay can be represented by causing the sphere to diminish in intensity until it as shown in FIG. 11*c*.

Figure 9:
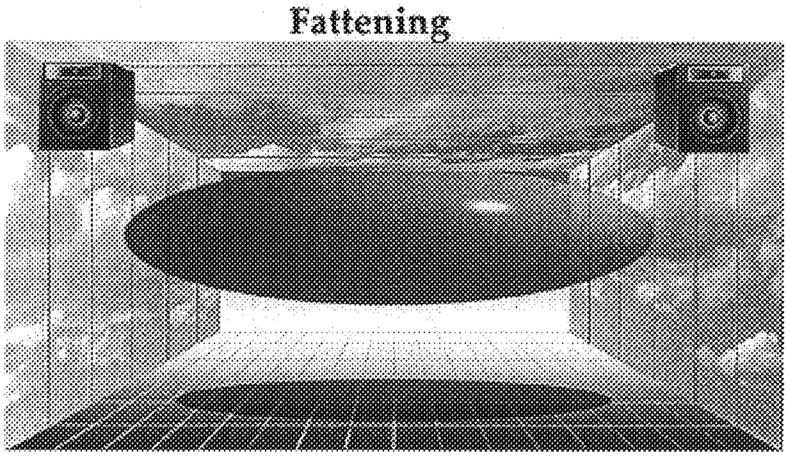
FIG. 9 illustrates a "fattened" sphere.

An unusual effect is observed when the sound delay is less than 30 milliseconds. The human ear is not quick enough to hear the difference between delay times this fast, and instead we hear a "fatter" sound, as illustrated in FIG. 9, instead of a distinct echo. For example, when one places the original sound in the left speaker and the short delay in the right speaker, the aural effect is that the sound is "stretched" between the speakers. A longer delay panned from left to right appears as illustrated in FIG. 11*d*.

Figure 10:
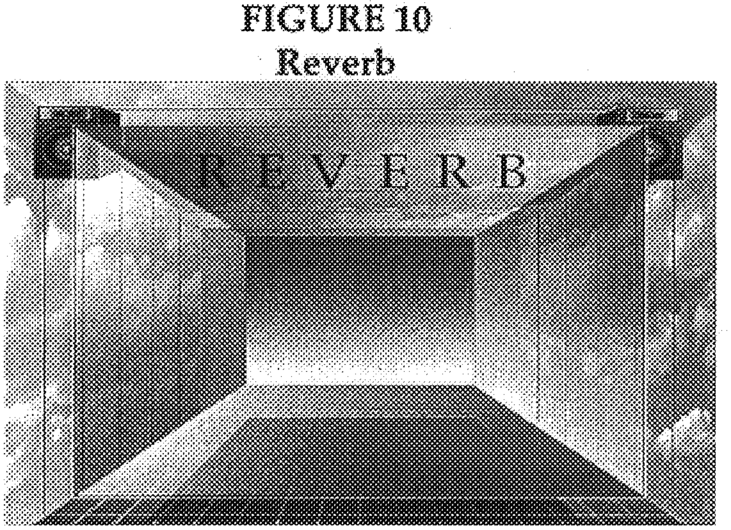
FIG. 10 illustrates a reverb cloud.

When reverb is used in a mix, it adds a hollow empty room sound in the space between the speakers and fills in the space between the different sounds. Depending on how the reverb returns are panned, the reverb will fill different spatial locations in the mix. Therefore, according to the present invention, reverb will be displayed as a second type of predefined visual image, separate and apart from the spheres. In the preferred embodiment, a transparent cube or cloud is selected as the image for the reverb effect, and the cloud fills the spaces between sounds in the mix, as illustrated in FIG. 10. The length of time that a reverb cloud remains visible corresponds to the reverb time. Like the spheres, the clouds will also have a degree of transparence or translucence that may be used, for example, to display changes in volume of the reverb effect. Naturally decaying reverb, where volume fades, can be shown by decreasing intensity.

Gated reverb, where volume is constant, may be shown by constant intensity, then abrupt disappearance. Reverse gated reverb, where volume rises, may be shown by increasing intensity. In this way, the various reverb effect are clearly and strikingly displayed in real time.

The color of the reverb cloud is a function of which sound is being sent out to create the reverb, i.e., which instrument is being sent out to the reverb effect processor via the auxiliary send port of the mixer. The color of the reverb cloud corresponds to the color of the sound sphere. If the reverb effect covers more than one instrument, the color of the reverb cloud may be a combination of the individual colors.

Figure 14:
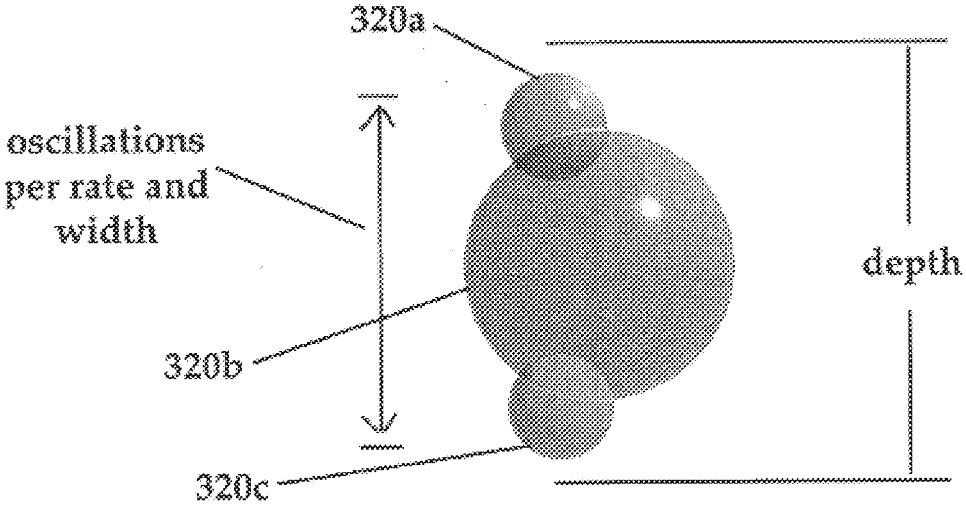
FIG. 14 illustrates a phase shifter, flanger or chorus effect.

Visual images for phase shifters, flangers and choruses are chosen to be the same since the audio parameters for each of these effects are the same. According to the preferred embodiment, there are two ways in which these effects may be shown. First, two spheres can be shown one in front of the other, as illustrated in FIG. 14, wherein the back sphere 320*a* oscillates up and down immediately behind the front sphere 320*b*. Second, the sphere can be shown as having a ring inside of it, wherein sweep time is displayed visually by rotating the ring in time to the rate of the sweep, as shown by icons 254–256 in FIG. 6. The depth of the effect, i.e., width or intensity, can be shown as ring width.

Figure 11A:
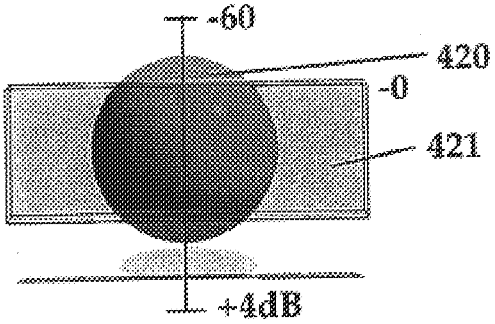
FIGS. 11*a* through 11*d* illustrate compression/limiter gate, a noise gate, delay time with regeneration and long delay respectively.

The image used to represent compressor/limiter effects is a sphere 420 having a small transparent wall 421 in front of it, as illustrated in FIG. 11*a*. Using the z-axis dimension to represent volume, the compression threshold is represented by the wall 421. Any signal volumes louder (closer) than the threshold will be attenuated based on the selected ratio setting.

Figure 11B:
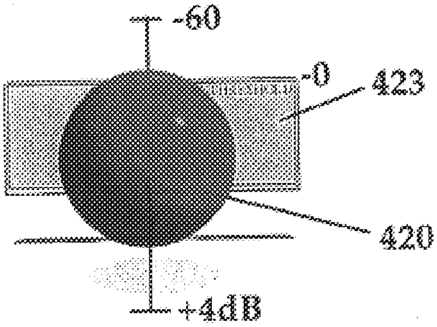
Figure 11C:
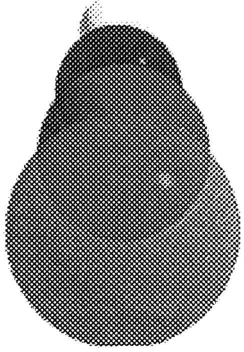
Figure 11D:
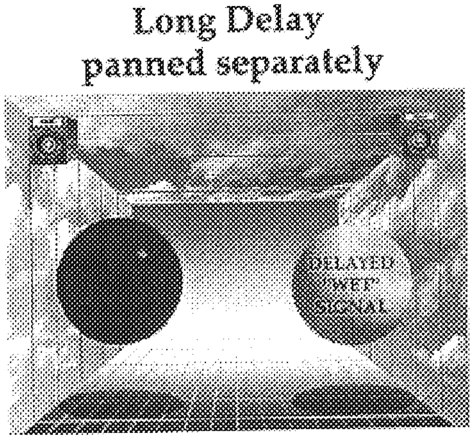

Likewise, noise gates can be represented by placing a small transparent wall 423 immediately behind the sphere 420, as illustrated in FIG. 11*b*. Thus, when volume is correlated to the z-axis, the noise gate threshold will be represented by the wall 423. As with compressor/limiters, attack and release settings would be strikingly visible.

Figure 12:
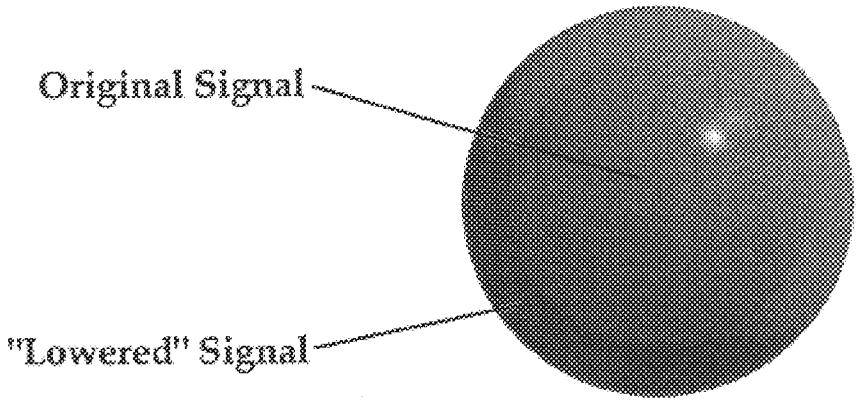
FIG. 12 illustrates a harmonizer effect.

A harmonizer effect, i.e., raising or lowering the pitch, is preferably shown as a smaller or larger sphere in relation to the original sphere, as illustrated in FIG. 12.

Figure 13:
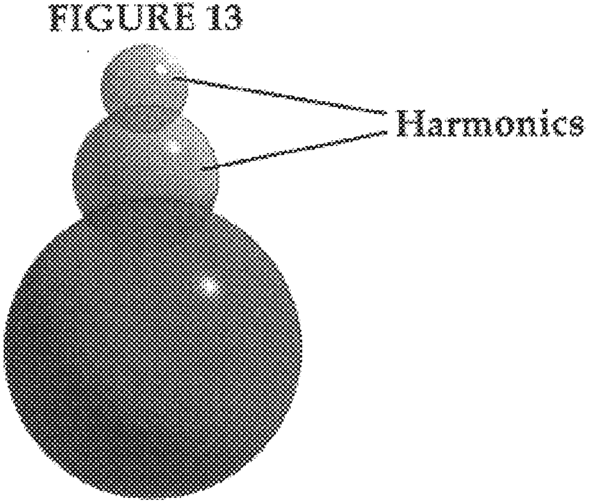
FIG. 13 illustrates an aural exciter effect.

An aural exciter or enhancer can be represented by stacking spheres on top of each other, as illustrated in FIG. 13. The top spheres decrease in size since they represent the harmonics that enhancers add.

The effects are selectable and a control icon is provided to allow selection and modification of the effect. For example, as shown in FIG. 6, the effects window may be selected to show every option which is available to the user.

Figure 15:
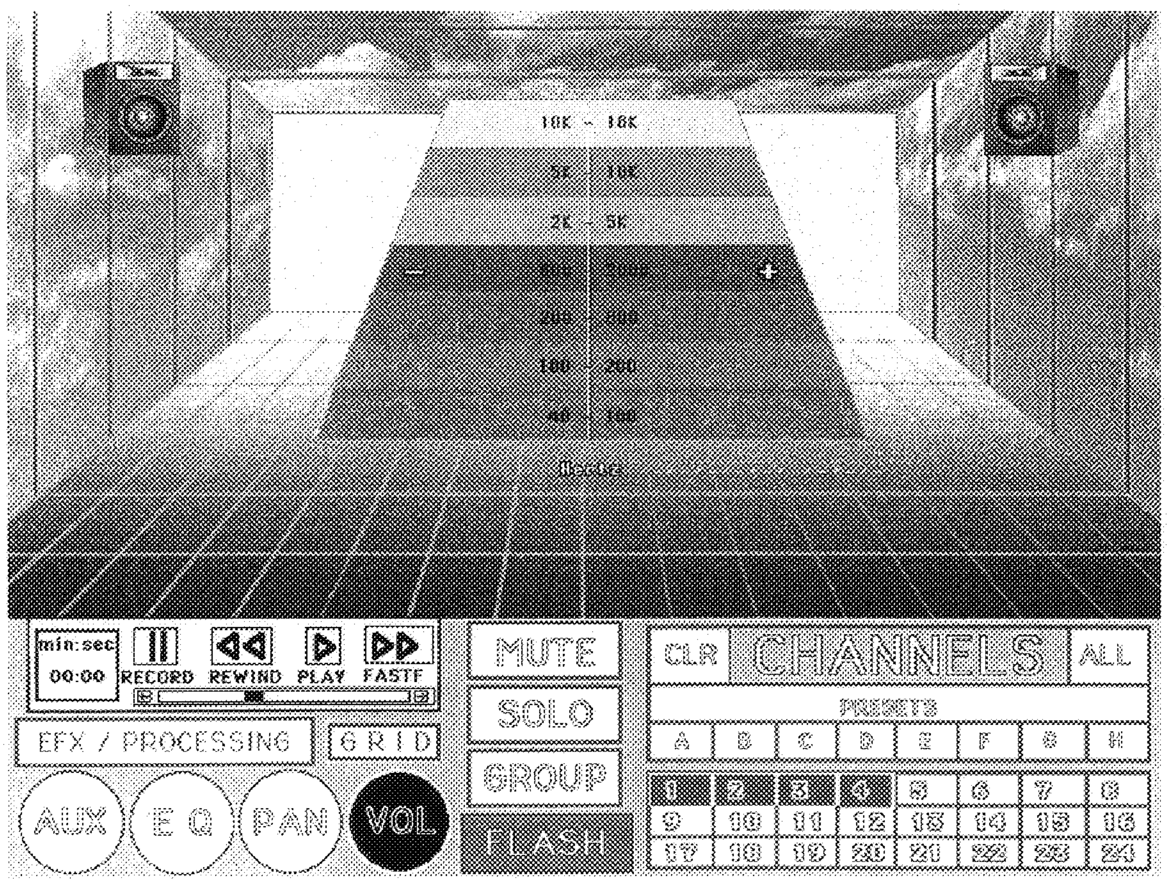
FIG. 15 illustrates the EQ window.

Returning to FIG. 3, the user can choose to enter the EQ window at stop 140. In the EQ window, each selected instrument is presented as a spectrum analysis. In the preferred embodiment, an inverted triangular shapes is used to show the frequency spectrum as shown in FIG. 15. Since high frequencies take up less space in the mix, the triangular shapes gets smaller as the frequency gets higher. Further, while the conceptual shape is triangular, the practical implementation is a trapezoid so as to provide a visually discernible portion for the highest frequency range of interest. Volume can once again be displayed as either movement along the z-axis or as color intensity. Using volume as a function of color intensity will be the most useful for comparing the relationships of equalization, frequency spectrum and harmonic structure. On the other hand, using volume as a function of the z-axis will be more convenient to precisely set equalization curves.

Showing the frequency spectrum of each instrument in this manner helps to solve the biggest problem that most people have in mixing: equalizing instruments relative to each other and understanding how the frequencies of instruments overlap or mask each other. When more than one instrument or the whole mix is shown, the relationships between the frequency spectrum and harmonics of the instruments becomes strikingly evident. In a good mix, the various frequency components of the sound are spread evenly throughout the frequency spectrum. When two instruments overlap, the color bands will overlap. If both instruments happen to be localized in the midrange, the overlapped color bands will become very dense and darker in color. The problem may be solved both aurally and visually by playing different instruments, or by changing the arrangement, or by panning or equalizing the sounds.

Figure 16:
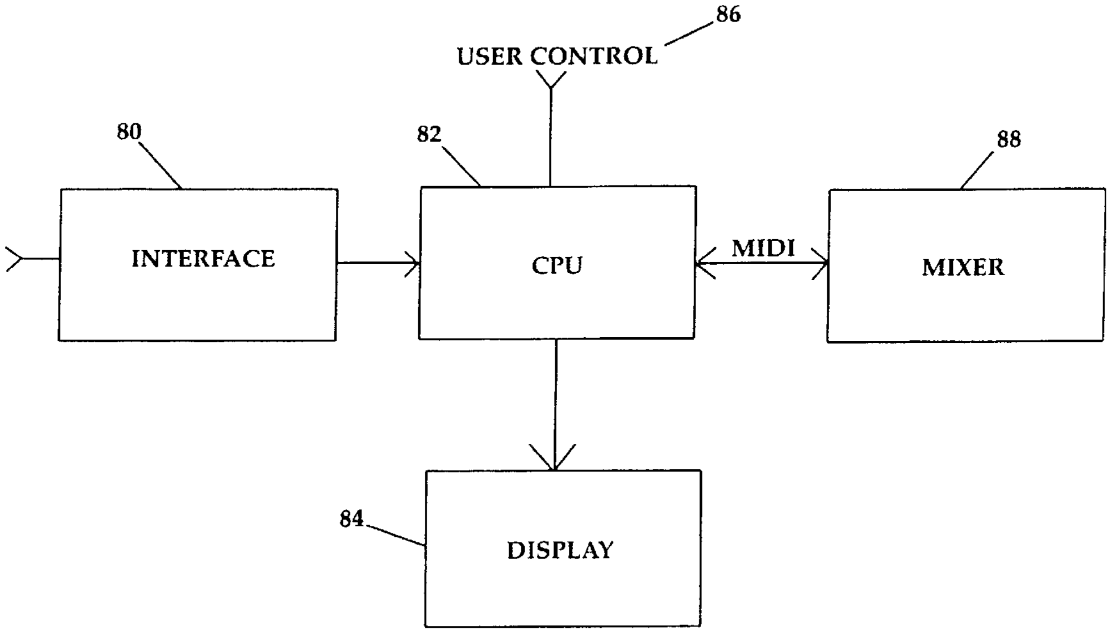
FIG. 16 is a block diagram of an alternative embodiment of an audio mixing system constructed in accordance with the present invention.

Referring now to FIG. 16, an alternative embodiment of the invention is illustrated. In this embodiment, audio source signals are not intercepted from the mixer inputs, but are coupled directly into an interface 80 which is then coupled to a CPU 82. The interface will typically include an A/D converter and any other necessary circuitry to allow direct digitization of the source signals for the CPU 82. The CPU 82 then creates visual images and displays them on video display monitor 84 in the manner already described. Adjustments to the visual images are made via a user control 86. If desired, MIDI information may be sent to an automated mixer board 88.

While the present invention has been described with reference to preferred embodiments, the description should not be considered limiting, but instead, the scope of the invention is defined by the claims.

I claim:

1. A method for mixing audio signals, wherein each audio signal has a plurality of audio characteristics associated therewith including a frequency component, comprising:

digitizing the audio signals;

generating a triangular shape for each digitized audio signal, said triangular shape being segmented into portions, each portion corresponding to a preselected frequency range;

dynamically correlating the frequency component of a selected audio signal with a corresponding segmented portion of the triangular shape; and displaying the triangular shape in a 3-dimensional representation of a volume of space.

2. An apparatus for mixing a plurality of audio signals, wherein each audio signal has a plurality of audio characteristics associated therewith, including a frequency component, an amplitude component, and a pan control component, comprising:

means for digitizing the audio signals, means for generating a spherical image for each digitized audio signal, each spherical image having a size correlated to the frequency component and the amplitude component of the audio signal, a location correlated to the pan control component, the frequency component and the amplitude component, a texture correlated to a selected effect, and a density correlated to the amplitude component, means for generating a triangular image for each digitized audio signal, each triangular image being segmented into portions, each portion thereof being correlated to a selected frequency range of the audio signal, and means for selectively displaying the spherical images and the triangular images in a 3-dimensional representation of a volume of space.

* * * * *